United States Patent
Kalekar et al.

(10) Patent No.: US 9,501,410 B2
(45) Date of Patent: Nov. 22, 2016

(54) PROVIDING LOCAL CACHE COHERENCY IN A SHARED STORAGE ENVIRONMENT

(71) Applicant: Symantec Corporation, Mountain View, CA (US)

(72) Inventors: Santosh Kalekar, Pune (IN); Niranjan Pendharkar, Pune (IN); Shailesh Marathe, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 204 days.

(21) Appl. No.: 13/838,125

(22) Filed: Mar. 15, 2013

(65) Prior Publication Data

US 2014/0281273 A1  Sep. 18, 2014

(51) Int. Cl.
*G06F 12/08* (2016.01)
*G06F 3/06* (2006.01)

(52) U.S. Cl.
CPC ............ *G06F 12/0833* (2013.01); *G06F 3/06* (2013.01); *G06F 3/067* (2013.01); *G06F 3/0619* (2013.01); *G06F 3/0638* (2013.01); *G06F 12/0817* (2013.01); *G06F 2212/1008* (2013.01); *G06F 2212/1024* (2013.01); *G06F 2212/284* (2013.01); *G06F 2212/311* (2013.01)

(58) Field of Classification Search
None
See application file for complete search history.

(56) References Cited

U.S. PATENT DOCUMENTS

| | | | |
|---|---|---|---|
| 5,787,477 A * | 7/1998 | Rechtschaffen .... | G06F 12/0828 711/119 |
| 5,860,153 A * | 1/1999 | Matena et al. ................ | 711/216 |
| 6,842,829 B1 | 1/2005 | Nichols et al. | |
| 8,392,661 B1 | 3/2013 | Metcalf | |
| 2003/0187927 A1 | 10/2003 | Winchell | |
| 2005/0182906 A1 * | 8/2005 | Chatterjee et al. ............ | 711/144 |
| 2007/0101069 A1 * | 5/2007 | Corbett et al. ................ | 711/141 |
| 2007/0208756 A1 | 9/2007 | Stakutis et al. | |
| 2010/0199042 A1 | 8/2010 | Bates et al. | |
| 2011/0179231 A1 | 7/2011 | Roush | |
| 2012/0089786 A1 * | 4/2012 | Pruthi .......................... | 711/141 |
| 2013/0019067 A1 * | 1/2013 | Vilayannur et al. .......... | 711/144 |

OTHER PUBLICATIONS

Hennessy et al. Computer Architecture: A Quantitative Approach. 2007. Morgan Kaufmann. 4th ed. pp. 205-237.*
Censier et al. "A New Solution to Coherence Problems in Multicache Systems." Dec. 1978. IEEE. IEEE Transactions on Computers. vol. C-27. pp. 1112-1118.*
Hennessy et al. Computer Organization and Design. 1998. Morgan Kaufmann. 2nd ed. p. 547.*
Lebeck et al. "Dynamic Self-Invalidation: Reducing Coherence Overhead in Shared-Memory Multiprocessors." Jun. 1995. http://ftp.cs.wisc.edu/wwt/isca95_dsi.pdf. ISCA '95.*
PCT International Search Report and Written Opinion for Counterpart Application PCT/US2014/028614 dated Aug. 18, 2014, 10 pages.

* cited by examiner

*Primary Examiner* — Nathan Sadler
(74) *Attorney, Agent, or Firm* — Campbell Stephenson LLP

(57) ABSTRACT

Multiple nodes of a cluster have associated non-shared, local caches, used to cache shared storage content. Each local cache is accessible only to the node with which it is associated, whereas the cluster-level shared storage is accessible by any of the nodes. Attempts to access the shared storage by the nodes of the cluster are monitored. Information is tracked concerning the current statuses of the local caches of the nodes of the cluster. Current tracked local cache status information is maintained, and stored such that it is accessible by the multiple nodes of the cluster. The current tracked local cache status information is used in conjunction with the caching functionality to determine whether specific nodes of the cluster are to access their local caches or the shared storage to obtain data corresponding to specific regions of the shared storage.

19 Claims, 6 Drawing Sheets

PROVIDING LOCAL CACHE COHERENCY IN A SHARED STORAGE ENVIRONMENT

TECHNICAL FIELD

This disclosure pertains generally to caching, clustering and storage management, and more specifically to providing local cache coherency in a shared storage environment such as a cluster.

BACKGROUND

Clusters are groups of computers that use groups of redundant computing resources in order to provide continued service when individual system components fail. More specifically, clusters eliminate single points of failure by providing multiple servers, multiple network connections, redundant data storage, etc. Absent clustering, if a server running a particular application fails, the application would be unavailable until the server is restored. In a clustering system, the failure of a server (or of a specific computing resource used thereby such as a network adapter, storage device, etc.) is detected, and the application that was being run on the failed server is automatically restarted on another computing system (i.e., another node of the cluster). This process is called "failover."

Clustering systems are often combined with storage management products that provide additional useful features, such as journaling file systems, logical volume management, multi-path input/output (I/O) functionality, etc. Where a cluster is implemented in conjunction with a storage management environment, the computer systems (nodes) of the cluster can access shared storage. The shared storage is typically implemented with multiple underlying physical storage devices, which are managed by the clustering and storage system so as to appear as a single storage device to computer systems accessing the shared storage.

An individual node of a cluster can use a non-shared, local read cache. For example, the local cache can be in the form of a solid state drive (SSD) using fast integrated circuit based memory. The node can use its local cache for read caching of shared storage, which can significantly decrease latency. However, each such cache is local to the individual node and not shared between nodes in the cluster, whereas the shared storage is global to the cluster and shared between multiple nodes. Therefore, a node can erroneously read stale data from its local cache after a cluster based event affecting shared storage such as a failover, if cached blocks of shared storage are modified by another node of the cluster.

It would be desirable to address this issue.

SUMMARY

Multiple nodes of a cluster have associated non-shared, local caches. The nodes of the cluster uses their associated local caches to cache shared storage content. Each local cache is accessible only to the node with which it is associated, whereas the cluster-level shared storage is accessible by any of the nodes. Attempts to access the shared storage by the nodes of the cluster are monitored. This can take the form of monitoring operations that move content between nodes of the cluster and the shared storage. At least some monitored operations that are performed by specific nodes of the cluster result in updates being made to at least the given node's associated local cache. Information is tracked concerning the current statuses of the local caches of the nodes of the cluster. More specifically, the information gleaned from monitoring node-level attempts to access the shared storage is used to determine the statuses of the local caches. This can involve tracking which nodes of the cluster do and do not have current shared storage content locally cached, for which regions (e.g., data volumes) of the shared storage.

The current tracked local cache status information is maintained, such that, for each local cache of the cluster, updates to the status of the specific local cache made in response both to its associated node, and to other nodes of the cluster, accessing the shared storage are tracked. For example, the current tracked local cache status information can be updated to indicate local cache status changes for one or more local caches, responsive to at least one monitored operation targeting at least one region of the shared storage. Responsive to a read operation by a specific node of the cluster targeting at least one region of the shared storage, the current tracked local cache status information can be updated to indicate a corresponding local cache status change for the specific node. Responsive to a write operation by a specific node of the cluster targeting at least one region of the shared storage, the current tracked local cache status information can be updated to indicate corresponding local cache status changes for the specific node and for additional nodes of the cluster.

The current tracked local cache status information is stored such that it is accessible by the multiple nodes of the cluster. For example, the tracked information can be stored in a data structure on the shared storage. In one embodiment, such a data structure further comprises a bitmap containing, for each specific node of the cluster, a separate bit set representing the current tracked local cache status of the local cache associated with the specific node, wherein each bit set comprises one bit representing each tracked region of the shared storage. In another embodiment, a portion of the data structure is stored on the shared storage such that it is accessible by the multiple nodes of the cluster, and, for each specific node of the cluster, a portion of the data structure is stored locally by, and is accessible only to, the specific node. In one embodiment, such a data structure comprises, for each specific node of the cluster, a set of data variables representing a current tracked local cache status of the local cache associated with the specific node, and a single, shared set of data variables indicating a current content status of the shared storage, wherein each specific data variable of each data variable set represents a specific region of the shared storage.

The current tracked local cache status information is used in conjunction with the caching functionality to determine whether specific nodes of the cluster are to access their local caches or the shared storage to obtain data corresponding to specific regions of the shared storage.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that other embodiments of the structures and methods illustrated herein may be employed without departing from the principles described herein.

DETAILED DESCRIPTION

Figure 1:
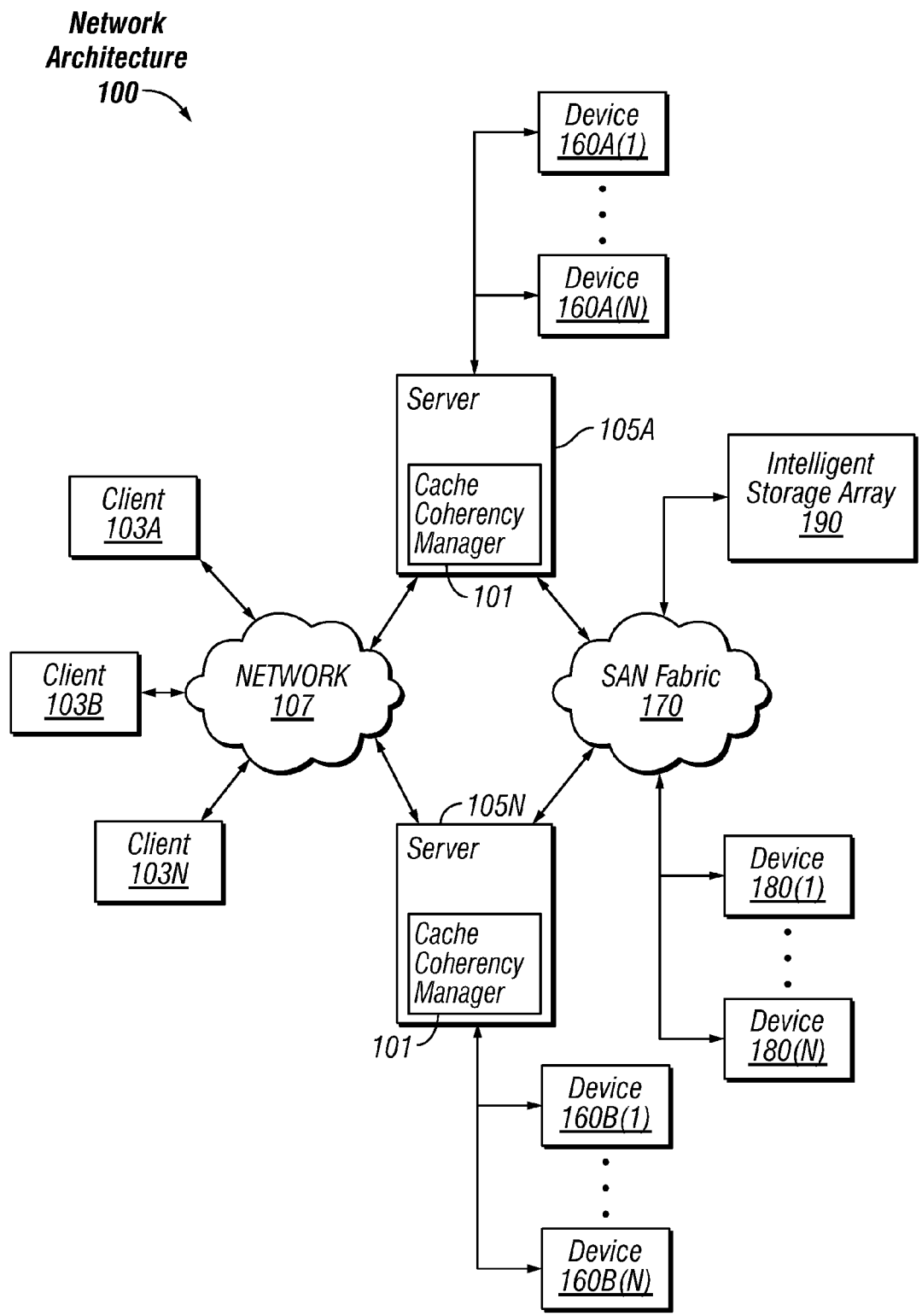
FIG. 1 is a block diagram of an exemplary network architecture in which a cache coherency manager can be implemented, according to some embodiments.

FIG. 1 is a block diagram illustrating an exemplary network architecture 100 in which a cache coherency manager 101 can be implemented. In the illustrated network architecture 100, client systems 103A, 103B and 103N, as well as servers 105A and 105N, are communicatively coupled to a network 107. A cache coherency manager 101 is illustrated as residing on servers 105A and 105N, but in other embodiments the cache coherency manager 101 can reside on more, fewer or different computers 210 as desired. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. In other embodiments, shared storage is implemented using FC and iSCSI (not illustrated) instead of (or in combination with) a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190.

Although FIG. 1 illustrates three clients 103A-N and two servers 105A-N as an example, in practice many more (or fewer) computers can be deployed. In one embodiment, the network 107 is in the form of the Internet. Other networks 107 or network-based environments can be used in other embodiments.

Figure 2:
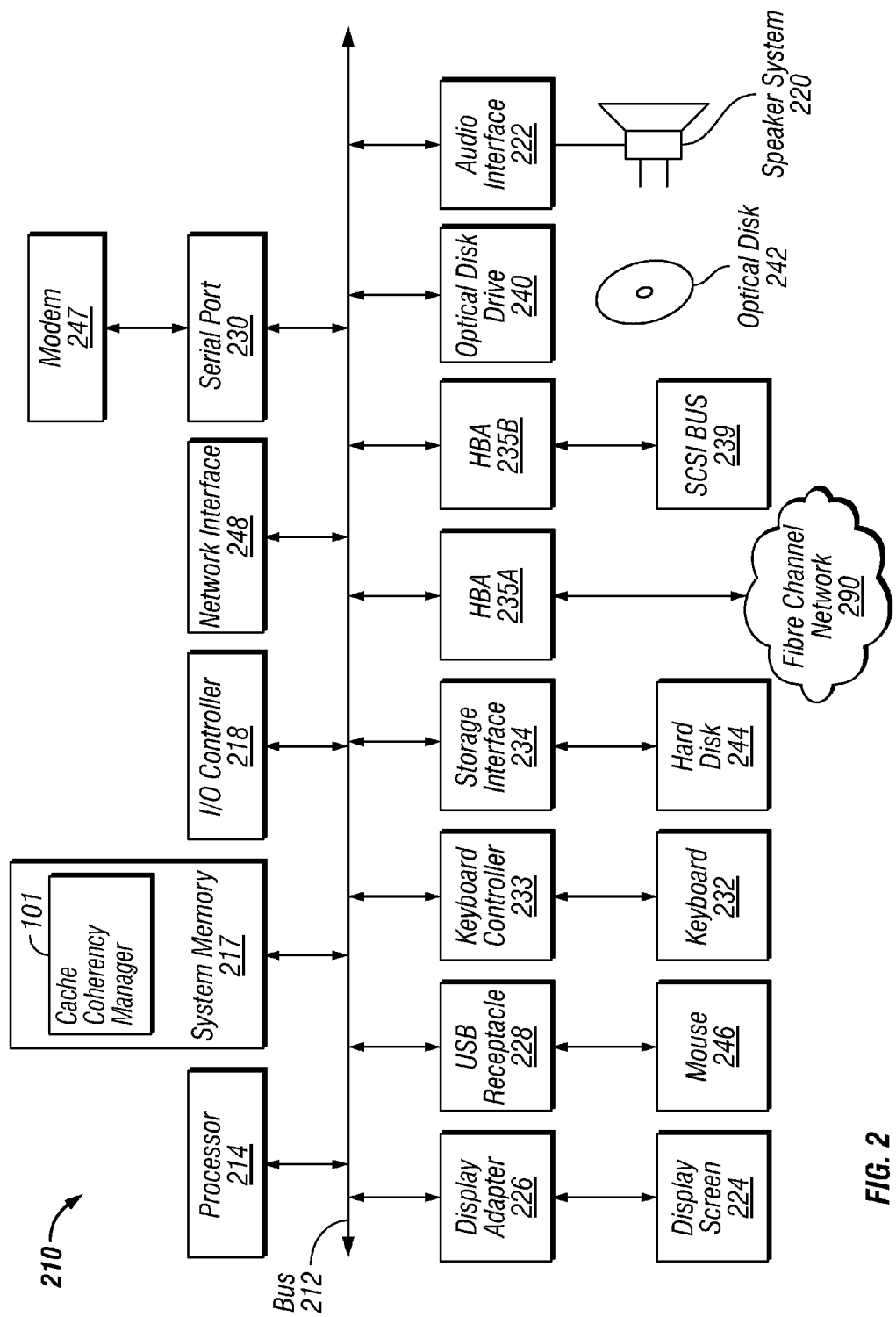
FIG. 2 is a block diagram of a computer system suitable for implementing a cache coherency manager, according to some embodiments.

FIG. 2 is a block diagram of a computer system 210 suitable for implementing a cache coherency manager 101. The clients 103 and servers 105 illustrated in FIG. 1 can be in the form of computers 210 such as the one illustrated in FIG. 2. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the cache coherency manager 101 is illustrated as residing in system memory 217. The workings of the cache coherency manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
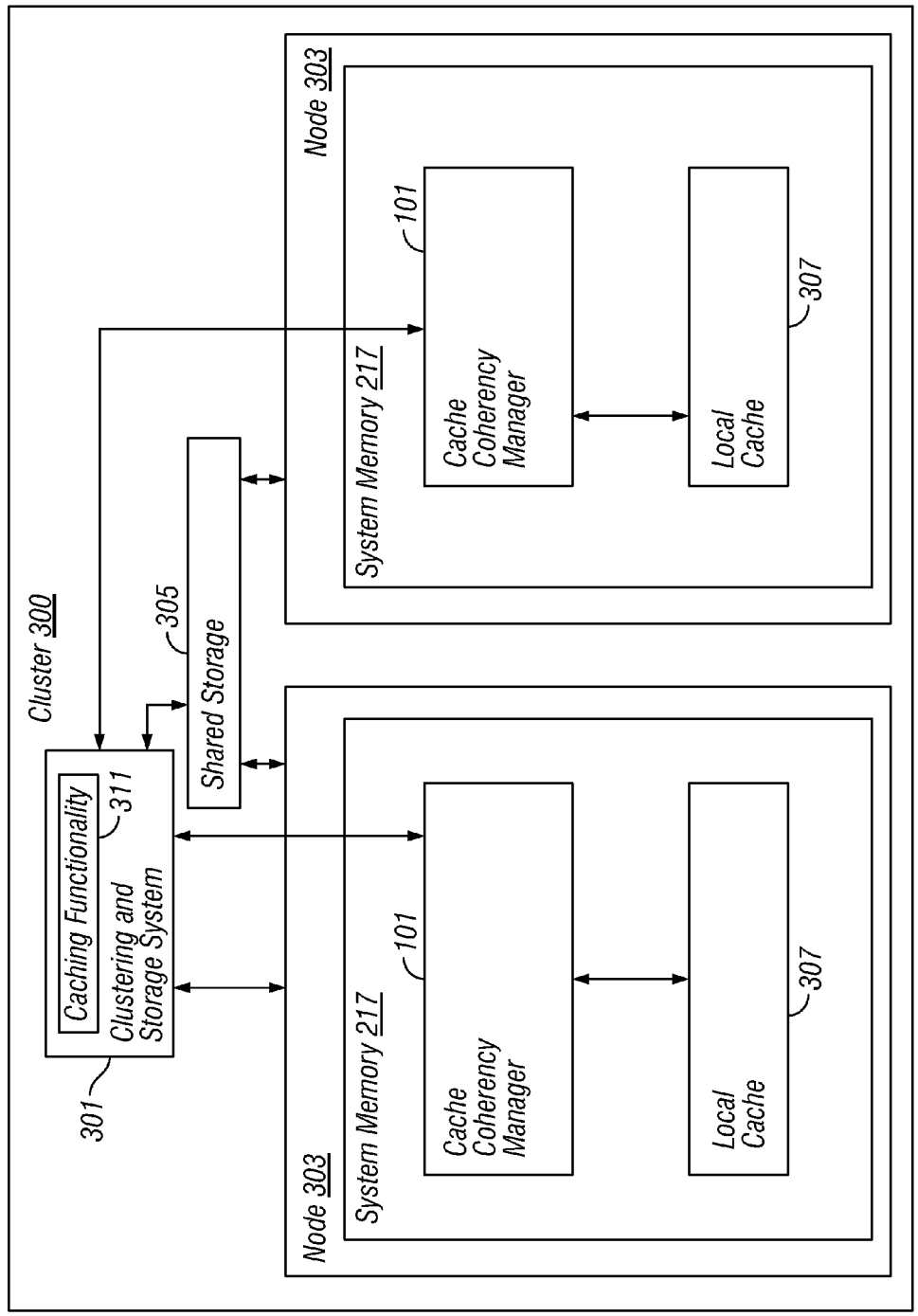
FIG. 3 is a block diagram of a cache coherency manager operating in the context of a shared storage cluster, according to some embodiments.

FIG. 3 illustrates the operation of a cache coherency manager 101 within the context of a shared storage cluster 300, according to some embodiments. FIG. 3 illustrates an instance of a cache coherency manager 101 running on each one of multiple nodes 303 (computer systems) of a cluster 300, wherein each node 303 is in the form of a computer system 210. It is to be understood that the functionalities of the cache coherency manager 101 can reside on a server 105, client 103, or be distributed between multiple computer systems 210, including within a fabric/cloud-based computing environment in which the functionality of the cache coherency manager 101 is provided as a service over a network 107. It is to be understood that although a cache coherency manager 101 is illustrated in FIG. 3 as a single entity, the illustrated cache coherency manager 101 represents a collection of functionalities, which can be instantiated as a single or multiple modules as desired. It is to be understood that the modules of the cache coherency manager 101 can be instantiated (for example as object code or executable images) within the system memory 217 (e.g., RAM, ROM, flash memory) of any computer system 210, such that when at least one processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the cache coherency manager 101 can be stored on computer-readable storage media, such that when the program code is loaded into computer memory 217 and executed by at least one processor 214 of the computer system 210, the computer system 210 executes the associated functionality. Any form of non-transitory computer readable medium can be used in this context, such as magnetic or optical storage media. As used herein, the term "computer readable medium" does not mean an electrical signal separate from an underlying physical medium.

FIG. 3 illustrates a cluster 300 instantiated in the context of a clustering and storage system 301 utilizing shared storage 305. For efficiency of illustration and explanation, the clustering and storage system 301 is illustrated as a centralized component residing outside of any node 303. It is to be understood that the clustering and storage system 301 represents a collection of functionalities, which in practice are typically instantiated as a plurality of components that are distributed throughout the cluster 300. Note also that although the shared storage 305 is illustrated and described in conjunction with FIG. 3 as if it were a single storage device 160, in practice it is typically implemented with multiple underlying physical storage devices 160, which are managed by the clustering and storage system 301 so as to appear as a single storage device 160 to computer systems 210 accessing the shared storage 305.

Although FIG. 3 illustrates a cluster 300 of only two nodes 303, it is to be understood that a cluster 300 can or more (and in some embodiments many more) than two nodes 303. Each node 303 can be instantiated as a physical (or virtual) host computer 210, for example a physical computer 210 of the type illustrated in FIG. 2. Each illustrated node 303 has a local, non-shared cache 307. In one embodiment each non-shared cache 307 is instantiated in the form of an SSD drive. In other embodiments, other storage technologies can be used to implement local caches 307 as discussed in greater detail below. Local caches 307 are used by nodes 303 for caching of shared storage 305 content. Thus, as individual nodes 303 access the shared storage 305, the local caches 307 can be used to cache shared storage data, according to whatever caching algorithm is used by the clustering functionality 311 of the clustering and storage system 301 (e.g., a conventional or customized caching algorithm). Note that all of the shared storage data resides on the shared storage 305, and subsets of the shared storage data can be stored in local caches 307 to reduce access latency (this is sometimes described as read caching). A cache coherency manager 101 runs in the system memory 217 on each illustrated node 303, and implements various functionalities to provide local cache coherency within the shared storage cluster 300, as described in detail below.

Figure 4:
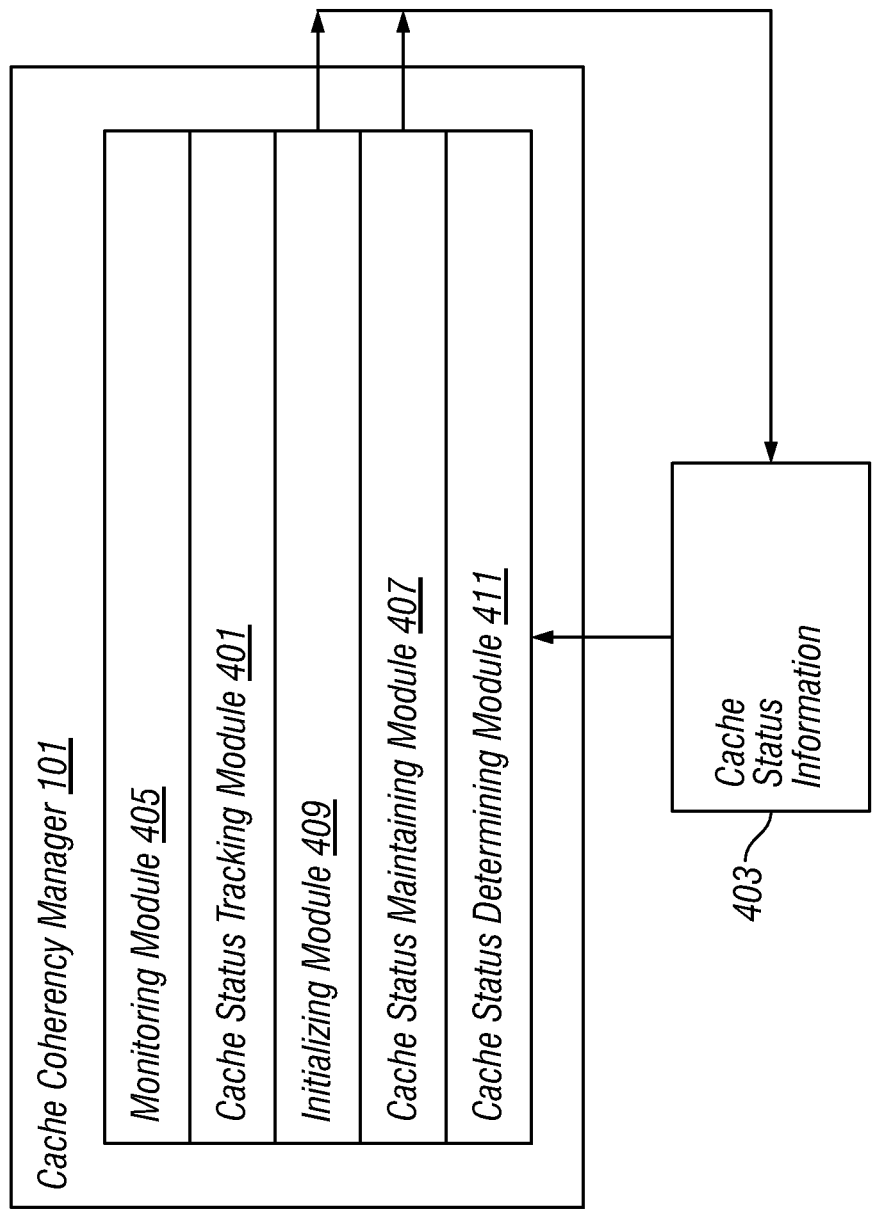
FIG. 4 is a block diagram of the operation of a cache coherency manager, according to some embodiments.

FIG. 4 illustrates specific modules of the cache coherency manager 101, and describes their operation at a high level. Note that the operation of these modules in different specific scenarios is described in greater detail below in conjunction with FIGS. 5A-D and 6A-D.

A shared storage access monitoring module 405 of the cache coherency manager 101 monitors node-level attempts to access of the shared storage 305. More specifically, an instance of the cache coherency manager 101 runs on each node 303 of the cluster 300 (this is illustrated in FIG. 3). A specific instance of the shared storage access monitoring module 405 on a given node 303 monitors operations performed by the given node 303 that attempt to access the shared storage 305. These operations can result in the caching functionality 311 of the clustering and storage system 301 updating the node's local cache 307. Examples of such operations include disk reads, disk writes, and other access operations targeting the shared storage 305 such as mount and format. Because the clustering and storage system 301 supports local node-level caching of shared storage content, operations that move content between a given node 303 and the shared storage 305 can result in the updating of the node's local cache 307. To monitor the operations of interest, the shared storage access monitoring module 405 can intercept or otherwise hook and/or wrap the relevant calls. The specific implementation mechanics to use for the monitoring varies between embodiments (e.g., system call interception, file system filter driver, etc.). Additionally, the exact level at which to monitor such functionality can also vary between embodiments (e.g., file system level, block level, operating system level, hardware level, etc.).

Based on information gleaned from this monitoring, a cache status tracking module 401 of the cache coherency manager 101 tracks which nodes 303 have current shared storage content in their local cache 307 and which nodes 303 do not. The monitoring of the node-level access of the shared storage 305 provides information as to which nodes 303 have performed operations that affect the status of their local caches 307. Thus, this gleaned information is used to determine and track the statuses of the local caches 307 by the cache status tracking module 401. The tracking is performed at the level of individual data volumes (or smaller regions as explained below) of the shared storage 305. In other words, the cache status tracking module 401 tracks whether each given node's local cache 307 contains current data or stale data for each region (e.g., data volume) of the shared storage 305.

A cache status maintaining module 407 of the cache coherency manager 101 maintains (i.e., stores) the current tracked local cache status information 403, such that when any node 303 accesses a region of the shared storage 305, the tracked local cache status information 403 can be updated to indicate not only a change to the status of that node's local cache 307 for the region, but also to indicate status changes of every other node 303 of the cluster 300. As explained in detail below, some node-level operations that access the shared storage only affect the status of the accessing node's local cache 307. For example, a read operation can cause the reading node's local cache 307 to be updated to contain the current data for the target region of the shared storage 305, without affecting the status of the local cache 307 of any other node 303. However, other operations also affect the status of the local caches 307 of non-accessing nodes 303 of the cluster 300. For example, a write operation can result in the updating of the target region of the shared storage 305, without corresponding updates being made to the local caches 307 of the non-writing nodes 303. This results in the local caches 307 of the non-writing nodes 303 becoming stale for the region of the shared storage 305 that was updated by the write operation.

The cache status maintaining module 407 can maintain the cache status for each node 303 of the cluster 300 by storing the tracked local cache status information 403 in the form of one or more data structures. Some specific examples of data structures that are used for this purpose in certain embodiments are illustrated by and described in conjunction with FIGS. 5A-D and 6A-D. At least some of the tracked local cache status information 403 is maintained on the shared storage 305, such that it is globally available to the multiple nodes 303 of the cluster 300.

As described in more detail below, prior to the performance of any caching activity, an initializing module 409 of the cache coherency manager 101 can initialize all of the tracked local cache status information 403 (e.g., as stored in a data structure) to indicate that every node's local cache 307 is non-current for every region of the shared storage 305. The cache status maintaining module 407 then updates the tracked local cache status information 403 as the nodes 303 of the cluster 300 access the shared storage 305. A cache status determining module 411 of the cache coherency manager 101 can operate in conjunction with the caching functionality 311, and refer to the maintained tracked local cache status information 403 in order to determine whether a given node 303 can obtain current shared storage content for a given region from the node's local cache 307, or whether to obtain the content by accessing the shared storage 305 directly, in order to avoid obtaining stale content from the local cache 307. This process is described in more detail below.

Turning now to FIGS. 5A-D, in one embodiment the tracked local cache status information 403 is maintained in the form of a bitmap 501 on the shared storage 305, wherein the bitmap 501 contains a set 503 of bits for each node 303 of the cluster 300, and wherein each bit represents a specific region of the shared storage 305. Thus, where the regions in question are in the form of individual data volumes (as in the specific example scenario illustrated in FIGS. 5A-D), each bit set 503 comprises one bit for each volume of the shared storage 305. Because there is a separate bit set 503 for each node 303, the total number of bits in the bitmap 501 is equal to the product of the number of nodes 303 in the cluster 300 multiplied by the number of volumes on the shared storage 305. Thus, for each node 303, there exists a separate bit representing each volume of the shared storage 305. The cache status maintaining module 407 sets the values of these bits to indicate whether or not the node's local cache 307 contains the current data for the given volume of the shared storage 305. For example, in FIGS. 5A-D, a bit is set to 1 to indicate current and to 0 to indicate stale (in other embodiments, the cache status maintaining module 407 sets these values the other way around, with 0 indicating current and 1 indicating stale).

Over time, different individual ones of the multiple nodes 303 of the cluster 300 read, write and otherwise access volumes of the shared storage 305, and these access operations are monitored by the monitoring modules 405 of the instances of the cache coherency manager 101 on the various nodes 303. As described above, access of the shared storage 305 by a specific node 303 can affect the status (freshness and staleness) of its own local cache 307, as well as that of the local caches 307 of other nodes 303 in the cluster 300. Such cache status changes resulting from a given node's access operations are tracked by the instance of the cache status tracking module 401 on the specific node 303, and the cache status maintaining module 407 sets the corresponding bits for the affected volumes to the appropriate value for each affected node 303.

Figure 5A:
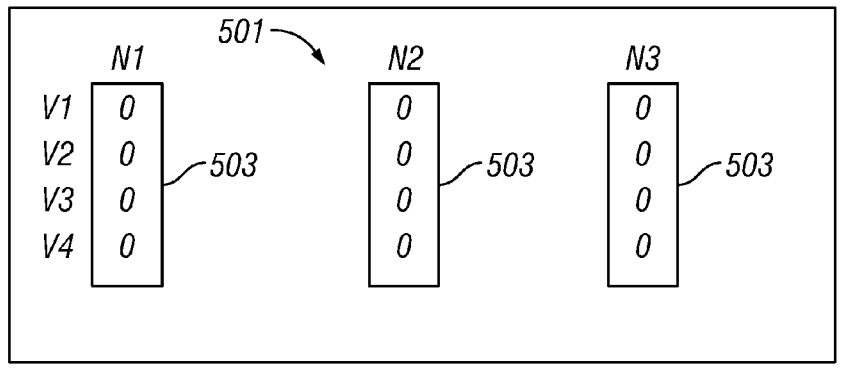
FIGS. 5A-D are state diagrams of data structures after specific example operations by a cache coherency manager, according to some embodiments.

FIGS. 5A, 5B, 5C and 5D illustrate specific examples of the use of a bitmap 501 to track the status of the local caches 307 of the multiple nodes 303 of the cluster 300. FIGS. 5A-D depict a bitmap 501 in a scenario in which there are three nodes 303 in the cluster 300 and the shared storage 305 comprises four separately cachable volumes. FIGS. 5A-D illustrates three columns: N1, N2 and N3. These columns contain the bit sets 503 for the nodes 303 of the cluster 300. More specifically, each column represents the local cache 307 of its corresponding node 303 (i.e., nodes 303A, 303B and 303C respectively). The four rows of FIG. 5A are labeled V1, V2, V3 and V4, and these rows represent the four volumes of the shared storage 305 (referred to herein as volumes 1-4 respectively). Thus, the bit at coordinates N1, V1 indicates the status of volume 1 in node 303A's local cache 307, the bit at N2, V4 indicates the status of volume 4 in node 303B's local cache 307, etc. In FIGS. 5A-D, a bit is illustrated as having a value of 1 to indicate that the corresponding volume in the corresponding node's local cache 307 is current, and a value of 0 to indicate that the corresponding volume in the corresponding node's local cache 307 is stale.

FIG. 5A illustrates the bitmap 501 in a state after it has been initialized, but before any caching activity has occurred. In general, prior to the occurrence of caching activity, the initializing module 409 can initialize all of the tracked local cache status information 403 to indicate that every node's local cache 307 is non-current for every volume of the shared storage 305. This is the case because no caching activity has yet been performed. In the embodiment illustrated in FIG. 5A, this initialization is performed by setting each bit of each bit set 503 in the bitmap 501 to 0.

Figure 5B:
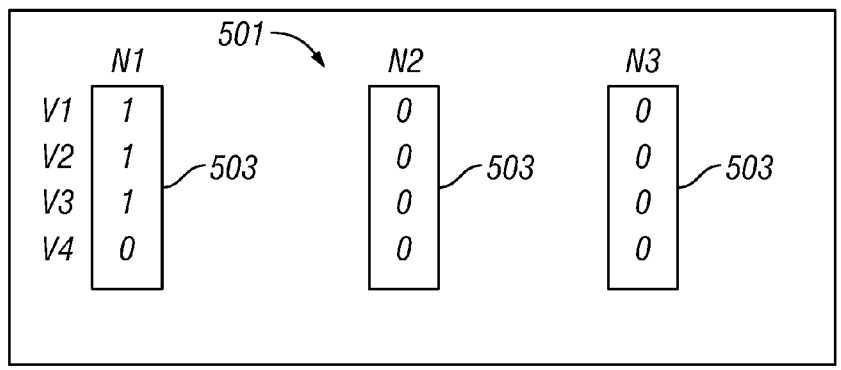

Referring now to FIG. 5B, suppose that node 303A mounts volumes 1-3. This action will enable caching of the content of these volumes in node 303A's local cache 307. The shared storage access monitoring module 405 monitors the mounting operation, and the cache status maintaining module 407 sets the bits representing volumes 1-3 in the bit set 503 corresponding to node 303A to 1s, thereby updating the bitmap 501 to indicate that node 303A's local cache 307 is now current for these volumes. This is the case because when node 303A mounts these volumes, the clustering and storage system 301 caching functionality 311 updates node 303A's local cache accordingly. Note that the cache coherency manager 101 is not performing the actual updating of the local caches 307 per se, which is handled by whatever caching functionality 311 is deployed on the clustering and storage system 301 and nodes 303 thereof. However, as described above, the cache coherency manager 101 tracks the status of each local, non-shared cache 307 at a shared, cluster-wide level.

In the case of the mounting operation, the cache status maintaining module 407 updates the bits corresponding to the node 303 that performs the mounting as described above, but does not update the bits corresponding to other nodes 303 (i.e., nodes 303 other than the one that performed the mounting). This is so because mounting is a read-only operation, and reading from the shared storage 305 does not update the local caches 307 of the non-reading nodes 303. FIG. 5B illustrates the state of the bitmap 501 after the above-described mounting of volumes 1-3 by node 303A, in which the bits corresponding to only those three volumes in node 303A's local cache 307 have been set to 1 to indicate that they now contain current data. The bit corresponding to volume 4 in node 303A's local cache 307, as well as all of the bits pertaining to the other nodes (nodes 303B and 303C), are unchanged from FIG. 5A.

As with the read only mounting operation, whenever a given node 303 reads a specific volume of the shared storage 305, the bit corresponding to the read volume for the reading node 303 is set to indicate a status of current, whereas the bits corresponding to that volume for the other nodes 303 are not modified. As described above in the context of mounting, after a node 303 reads a volume, its local cache 307 will contain current data for that volume, so if the corresponding bit was previously set to non-current, it is updated to current (if the bit was already set to current before the read operation, its value is left alone). Because the read operation does not affect the status of the local caches 307 of the other (non-reading) nodes 307, their bit sets 503 in the bitmap 501 are not updated. Furthermore, the read operation does not affect the status of the non-read volumes in the local cache 307 of the reading node 303, and therefore the bits pertaining to those volumes are not updated either.

Figure 5C:
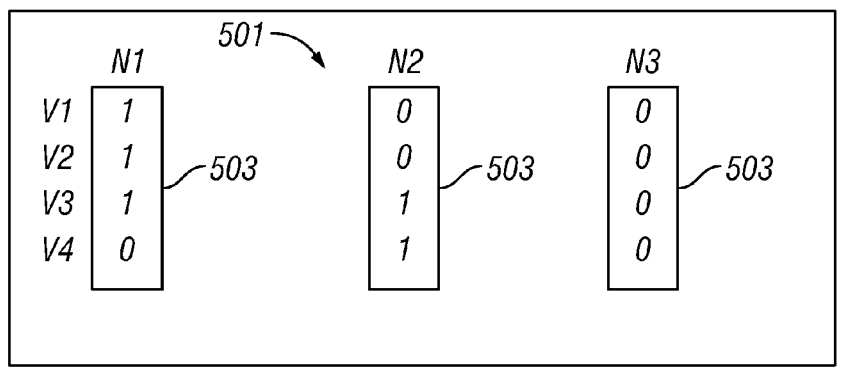

To illustrate this functionality further in reference to FIG. 5C, suppose that node 303A reads volume 1 of the shared storage 305, and node 303B reads volumes 3 and 4. Prior to these read operations, the bit representing volume 1 in node 303A's local cache 307 is already set to current (i.e., bit N1, V1 has a value of 1 as a result of the mount operation described in conjunction with FIG. 5B). Therefore, the value of this bit is not changed as a result of node 303A's read operation. However, prior to node 303B's read of volumes 3 and 4, node 303B's bits representing these volumes (i.e., bit N2, V3 and bit N2, V4) were set to 0, indicating a status of non-current. The read operation results in node 303B's local cache 307 being current for these volumes, so the values of these bits are updated to indicate this current status. The state of the bitmap 501 after these two read operations is illustrated in FIG. 5C.

Figure 5D:
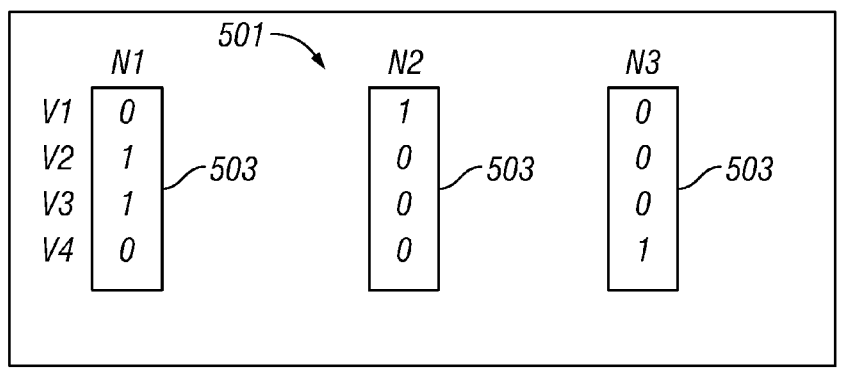

Turning now to FIG. 5D, consider the case of write operations. A specific node 303 writing new content to a given volume of the shared storage 305 results in the writing node's local cache 307 being current for the volume, but the local caches 307 of the other nodes 303 being non-current (stale). More specifically, the write operation writes new content to the target volume of the shared storage 305. The new content originates from the writing node 303, and when the writing node 303 accesses the volume on the shared storage 305 during the write operation, the caching functionality 311 uses the written content to keep the writing node's local cache 307 current. However, the writing node 303 does not have access to the local caches 307 of the other nodes 303, none of which are automatically updated to contain the new content which is now on the updated volume of the shared storage 305. Therefore, whenever the shared storage access monitoring module 405 monitors a given node 303 writing to a specific volume of the shared storage 305, the cache status maintaining module 407 sets the bit corresponding to the affected volume for the writing node 303 to indicate a status of current (or if the bit was already set to current before the write operation, its value is not changed), as with a read operation. However, unlike a read operation, the bits corresponding to the target volume for the non-writing nodes 303 are up-dated to indicate a status of non-current (if any of these bits are already set to non-current before the write operation, their value is not changed). As explained above, the local caches 307 of the non-writing nodes 303 are stale for the affected volume(s) after the write operation. This result is accounted for by the updating of the bitmap 501 described above.

For example, referring to FIG. 5D, suppose that node 303B writes to volume 1 of the shared storage 305. The bit representing volume 1 in node 303B's local cache 307 is updated to current (i.e., bit N2, V1 is set to 1). Note that this was set to non-current (0) prior to the write operation, and thus is actively updated when the write operation occurs. Because the write to volume 1 by node 303B leaves the local caches 307 of nodes 303A and 303C stale for volume 1, the corresponding bits are set to 0. Node 303A's local cache 307 was current for volume 1 prior to the write operation, and thus the corresponding bit (N1, V1) is actively set to 0 to indicate that the status change. The bit corresponding to volume 1 of node 303C's local cache 307 was already set to 0 prior to the write operation, so its value is simply left as is.

Now suppose that node 303C writes to volume 4. The bit representing volume 4 in node 303C's local cache 307 (bit N3, V4) is set from its previous value of non-current (0) to current (1). This reflects the update of node 303C's local cache 307 resulting from the write operation. Prior to this write operation, the bit corresponding to volume 4 in non-writing node 303A was already set to non-current. Therefore, the value of this bit (bit N1, V4) is not changed as a result of node 303C's write to volume 4. However, the bit corresponding to volume 4 in non-writing node 303B (bit N2, V4) was set to current, and is therefore updated to non-current. The state of the bitmap 501 after these two write operations is illustrated in FIG. 5D.

In some scenarios, a given node 303 of the cluster 300 does not have a local cache 307. In response to a node 303 without a local cache 307 writing to the shared storage 305, the cache status maintaining module 407 still updates the bits corresponding to the affected volumes for any non-writing nodes 303 that do have local caches 307. In this case, even though the writing node 303 does not have a local cache 307 that is affected by the write operation, the content of the target volumes on the shared storage 305 is still updated, thereby resulting in the local caches 307 of other nodes 303 in the cluster 300 becoming stale for those volumes.

Under other circumstances, the writing node 303 has a local cache 307, but the local cache 307 cannot be updated based on the new content at the time of the write operation, for example because the SSD drive used to provide the local cache 307 has been temporarily disconnected from the node 303. In this case, in addition to updating the bitmap 501 to indicate that the local caches 307 of the non-writing nodes 303 are now stale, the cache status maintaining module 407 also updates the bitmap 501 to indicate that the local cache 307 of the writing node 303 is also stale concerning the target volume(s). Because the writing node 303 updated the volume(s) on the shared storage 305 but could not update its own local cache 307 accordingly, its local cache 307 is now stale for the affected volume(s), and thus the bitmap 501 is set to indicate as much.

Because the cache status maintaining module 407 maintains the bitmap 501 to reflect the status of each node's local cache 307 for each region of the shared storage 305, the cache status determining module 411 is able to accurately determine when a given node 303 can access specific shared storage content from its local cache 307, and when the local cache 307 is not current for a given region of the shared storage 305 and hence it is necessary to access the shared storage 305 directly. More specifically, when the caching functionality 311 attempts to access the given region of shared storage 305 from the specific node 303, the cache status determining module 411 can read the appropriate bits in the bitmap 501 to determine whether the node's local cache 307 contains current data for the region of shared storage 305, and direct the caching functionality 311 to access either the local cache 307 or the shared storage 305 accordingly.

In different embodiments, the interaction between the caching functionality 311 and the cache status determining module 411 can be implemented in different ways as desired. For example, in one embodiment the caching functionality 311 can be programmatically configured to call the cache status determining module 411, passing it the node 303 and shared storage region(s) of interest as parameters. In response, the cache status determining module 411 can return the status of the given regions in the node's local cache 307 to the caching functionality 311. In another embodiment, the cache status determining module 411 can hook the caching functionality 311, make the appropriate determinations for target nodes 303 and regions of shared storage 305, and direct the access attempt to target the corresponding local cache 307 or the shared storage 305 as appropriate. Regardless, the tracked local cache status information 403 (as stored in the bitmap 501 in the embodiment of FIGS. 5A-D) contains the status of the local caches 307 of the nodes 303 of the cluster 300. This status information is used to determine whether a given node 303 can obtain current shared storage content for a given region from the node's local cache 307, or whether the node 303 is to access the shared storage 305 directly, in order to avoid obtaining stale content from its local cache 307.

It is to be understood that although FIGS. 5A-D illustrate the use of a bitmap 501 to store the tracked local cache status information 403, other data structures can be used in other embodiments, such as arrays, linked lists or other objects as desired. Additionally, whereas FIGS. 5A-D illustrate the use of one bit per volume per node 303, in other embodiments additional bits (or other data elements) are used, for example to store administrative information or the like.

Furthermore, although the above description refers to caching and representing the shared storage 305 at a data volume level, in different embodiments different regions of the shared storage 305 are used. For example, the shared storage 305 can be cached and represented at a finer level of granularity than by data volume, such as by groupings of blocks wherein each block group is a subset of a volume. In a scenario with, e.g., one kilobyte (1K) data volumes, the above-described functionality could process, for example, groups of X blocks where X<1K and X MOD 1K=0.

Although the bitmap 501 is described as being maintained on shared storage 305, in one embodiment each node 303 maintains a copy of the bitmap 501 (or other data structure(s)) in local memory 217, and flushes updates to its local copy to shared storage 305 periodically (e.g., after 10 updates, after 100 updates, after 1000 updates, etc.). In this embodiment, if a given node 303 crashes before flushing its updates to shared storage 305, the cache coherency manager 101 uses the last known good tracked local cache status information 403 to correct the resulting lack of synchronization with the other nodes 303.

Turning now to FIGS. 6A-D, in another embodiment, some of the tracked local cache status information 403 is maintained on the shared storage 305 and some in the local cache 307 of each node 303. More specifically, in each node's local cache 307, an update counter set 601 corresponding to the given local cache 307 is maintained. Additionally, a single, shared update counter set 601 is maintained in the shared storage 305. Each local and shared update counter set 601 contains an update counter for each specific volume (or other region) of the shared storage 305. Each update counter is in the form of a data variable of a type such as an integer, suitable for tracking updates made to a given region of the shared storage 305 since an initialization point.

FIGS. 6A-6D illustrate specific states of the local and shared update counters as they are used to track the status of the local caches 307 of the multiple nodes 303 of the cluster 300. As above, in the scenario of FIGS. 6A-D, there are three nodes 303 in the cluster 300, and the shared storage 305 comprises four separately cachable volumes. FIGS. 6A-D illustrate four columns: S, LN1, LN2 and LN3. These columns contain one shared update counter set 601 and a local update counter set 601 for each node 303 of the cluster 300. More specifically, column S represents a shared update counter set 601 for use by all nodes 303, and columns LN1, LN2 and LN3 represent local update counter sets 601 for nodes 303A, 303B and 303C respectively. The four rows are labeled V1, V2, V3 and V4, and these rows represent volumes 1-4 of the shared storage 305. As explained in more detail in the specific examples given below, when the value of a given node's local update counter for a specific volume of shared storage 305 matches the value of the corresponding shared update counter for that volume, this indicates that the node's local cache 307 is current for the volume. Where the value of the node's local update counter for a given volume does not match the value of the corresponding shared update counter, a non-current (stale) status for the volume in the node's local cache 307 is indicated.

Figure 6A:
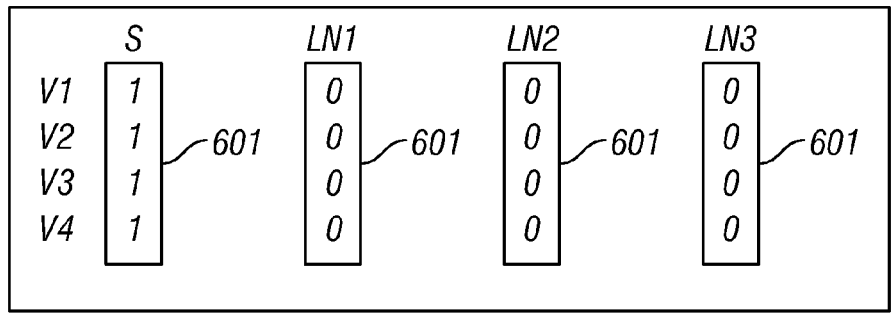
FIGS. 6A-D are state diagrams of data structures after specific example operations by a cache coherency manager, according to other embodiments.

FIG. 6A illustrates the update sets 601 in the state after initialization, but before any caching activity has occurred. Here, the initializing module 409 has initialized all of the update counters to indicate that every node's local cache 307 is non-current for every volume of the shared storage 305. This is the case because no caching activity has yet been performed. In the embodiment illustrated in FIG. 6A, this initialization is performed by setting each local update counter for each node 303 to 0, and each shared update counter to 1. Different initial non-matching values can be used in other embodiments, provided that the matching logic described below is maintained.

Figure 6B:
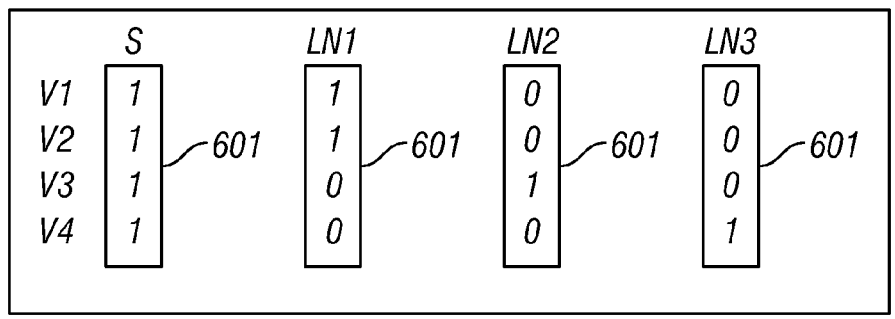

Referring now to FIG. 6B, suppose that node 303A mounts volumes 1 and 2. This operation enables caching of the content of the mounted volumes in node 303A's local cache 307. In response, the cache status maintaining module 407 sets the update counters representing volumes 1 and 2 in node 303A's local update counter set 601 to the value of the shared update counters for these volumes. Because the mounting operation has the effect of making the mounting node's local cache 307 current for the target volumes, the local update counters for the target volumes are set to the values of the corresponding shared update counters. This makes the values equal, which indicates a local cache 307 status of current for the mounted volumes on node 303A. In other words, node 303A's local update counters for volumes 1 and 2, which were 0 prior to the mounting operation, are set to the 1, which is the value of the shared update counters for volumes 1 and 2. Thus, node 303A's local update counters for these volumes now match the corresponding shared update counters, thereby indicating that node 303A's local cache 307 is now current for these volumes.

Suppose now that node 303B mounts volume 3 and node 303C mounts volume 4. The local update counters for these nodes 303 and volumes are also set to the values of the corresponding shared update counters, indicating that node 303B's local cache 307 is current for volume 3 and node 303C's local cache 307 is current for volume 4. FIG. 6B illustrates the state of the update counter sets 601 after the three above-described mounting operations.

As in the case of mounting, after a node 303 reads a volume, its local cache 307 will contain current data for that volume. Therefore, in response to monitoring a read operation, the value of the reading node's local update counters for the target volumes are set to the values of the corresponding shared update counters, if they do not match already. In other words, if the values of the node's local update counter and the corresponding shared update counter for the read volume already match (i.e., the node's local cache 307 was already current for the volume before the read operation), the value of the node's local update counter for the volume is left alone. However, where the values of these local and shared update counters do not match prior to the read operation, the local update counter corresponding to the read volume for the node 303 is set to the value of the corresponding shared update counter, thereby making the values equal and thus indicating that the node's local cache 307 is now current for the given volume. Because the read operation does not affect the status of the local caches 307 of the non-reading nodes 307, their local update counters for the read volume are not modified.

Figure 6C:
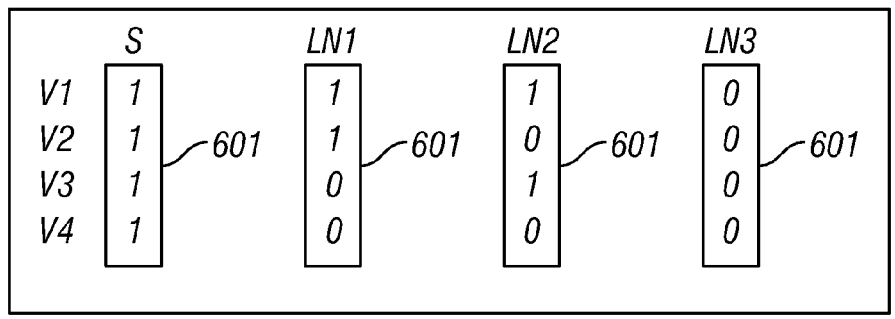

Referring to FIG. 6C, suppose that node 303A reads volume 2 of the shared storage and node 303B reads volume 1. Prior to these read operations, the value of node 303A's local update counter for volume 2 is already equal to the value of the corresponding shared update counter. This is the case because node 303A's local cache 307 was made current for this volume as a result of the mount operation described in conjunction with FIG. 6B. Therefore, the value of node 303A's local update counter for volume 2 is not affected in response to node 303A's read operation. However, prior to node 303B's read of volume 1, node 303B's local update counter for this volume was still set to its initialization value of 0, and is thus not equal to the value of the shared update counter for volume 1. This indicates that node 303B's local cache 307 has a status of non-current for this volume prior to the read operation. Because the read operation results in node 303B's local cache 307 becoming current for volume 1, node 303B's local update counter for volume 1 is set to the value of the shared update counter for volume 1, thereby making the values equal to indicate this current status. The state of the update counter sets 601 after these two read operations is illustrated in FIG. 6C.

Figure 6D:
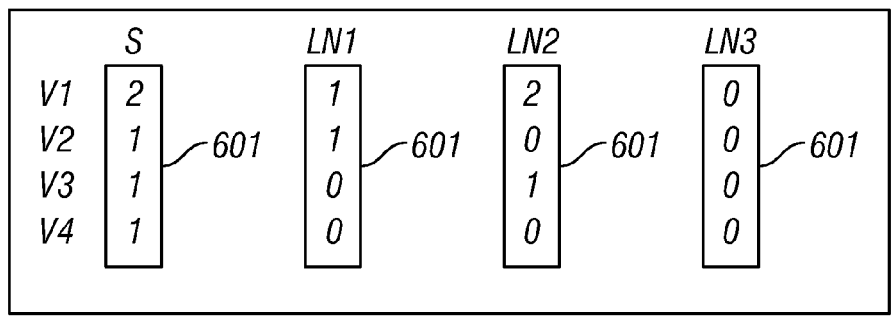

Turning now to FIG. 6D, the case of write operations is described. As explained above, after a specific node 303 writes new content to a given volume of the shared storage 305, the writing node's local cache 307 is current for the volume, but the local caches 307 of the other nodes 303 are non-current (stale). More specifically, the write operation writes new content to the target volume of the shared storage 305. The new content originates from the writing node 303, and when the writing node 303 accesses the volume on the shared storage 305, the caching functionality 311 uses the written content to keep the writing node's local cache current. However, the writing node 303 does not have access to the local caches 307 of the other nodes 303, none of which are automatically updated to contain the new content which is now on the updated volume of the shared storage 305.

When the shared storage access monitoring module 405 monitors a given node 303 writing to a specific volume of the shared storage 305, in response to the first write to the volume, the cache status maintaining module 407 increments the shared update counter for the target volume, to indicate that the volume of the shared storage 305 has been updated. The writing node's local update counter for the volume is set to the value of the incremented shared update counter, thereby indicating that the writing node's local cache 307 is current for the volume. Note that incrementing the value of the shared update counter for the updated volume results in the corresponding local update counters of all non-writing nodes 303 being unequal to the shared update counter, even where they were equal before the write operation. This indicates that all of the local caches 307 of all of the nodes 303 other than the one that performed the write operation are now stale for the volume, which is the case because the content of the volume was updated by the write operation. In other words, as explained above, the write operation results in the local caches 307 of the non-writing nodes 303 being stale for the affected volume, and this is captured by this incrementing of the shared update counter.

For example, referring to FIG. 5D, suppose that node 303B writes to volume 1 of the shared storage 305. The shared storage counter for volume 1 is incremented to 2, and node 303B's corresponding local update counter is set to the value of the incremented shared storage counter. This indicates that volume 2 has been updated, that the writing node's local cache 307 is current for volume 2, and that the local caches 307 of the non-writing nodes 303 are not current for this volume. The write to volume 1 by node 303B leaves the local caches 307 of nodes 303A and 303C stale for volume 1, and this is captured by incrementing the shared update counter for volume 1, which results in the corresponding local update counters of nodes 303A and 303C not being equal to the incremented shared update counter. The state of the update counter sets 601 after this write operation is illustrated in FIG. 5D.

Where the writing node 303 does not have a local cache 307 or cannot access its local cache 307 at the time of the write operation, the shared update counter for the target volume is still incremented, indicating that the local caches 307 of the other nodes 303 (and that of the writing node 303 if it has a (currently inaccessible) local cache 307) are now stale, as a result of the update to the volume by the write. As described above in conjunction with the FIGS. 5A-D embodiment, the embodiment of FIGS. 6A-D can also process the shared storage 305 by region size other than data volume.

It is to be understood that the shared storage 305 can be implemented in the form of an architecture such as a SAN fabric (or, e.g., FC or iSCSI). In other embodiments, the shared storage 305 is implemented via internode messaging. It is also to be understood that although the local caches 307 are illustrated as being physically local to their associated nodes 303, in some embodiments a local cache 307 can be logically local without being physically so. For example, a local cache 307 can be implemented on shared storage 305 but made logically local to given node 303 via, e.g., the caching functionality 311. In general, "shared" and "local" are functional descriptors, and storage, caches and other objects can be implemented as shared or local by using logical and/or physical resources as desired.

Finally, it is to be understood that although the cache coherency manager 101 can work in conjunction with and/or enhance the performance of the caching functionality 311 as described above, the cache coherency manager 101 is agnostic as to the specific caching algorithm used by the caching functionality 311.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method in a shared storage server for providing cache coherency within a cluster of multiple nodes, the method comprising:
communicating with a cache coherency instance at each of the multiple nodes of the cluster, wherein
the each of the multiple nodes comprises a local cache that is configured to cache shared storage content of the shared storage server,
each local cache is only accessible by the each node with which the each local cache is associated, and
the shared storage content is accessible by the multiple nodes of the cluster;
receiving one or more updates sent from the cache coherency instance executing on the each of the multiple nodes, wherein
the one or more updates represent one or more operations that are configured to access the shared storage content, when performed by the each node, and
each of the one or more updates is sent from a corresponding cache coherency instance after a predetermined number of operations are performed by the each node;
monitoring attempts to access the shared storage content by the each of the multiple nodes of the cluster based on the updates;
tracking statuses of the local caches of the multiple nodes of the cluster by determining whether an access attempt at a node affects the status of the local cache associated with the node and each of the other local caches of the other nodes in the cluster,
wherein
the access attempt comprises one or more accesses that modify the shared storage content and one or more accesses that do not modify the shared storage content, and
each status stored in the shared storage server indicates whether the each local cache has a current version of each portion of shared storage content; and
upon a subsequent access attempt by one node of the multiple nodes to a portion of the shared storage content in the local cache associated with the one node:
accessing a specific portion of shared storage content from the local cache associated with the one node, if a determination is made from the statuses stored in the shared storage server that the current version of the specific portion of shared storage content is stored in the local cache associated with the one node, and
accessing the specific portion of shared storage content from the shared storage server, if a determination is made from the statuses that the current version of the specific portion of shared storage content is not stored on the local cache associated with the one node.

2. The method of claim 1, wherein the monitoring the attempts to access the shared storage content by the each of the nodes of the cluster further comprises:
monitoring at least some operations being performed by a specific node of the cluster that result in an update being made to the local cache associated with the specific node.

3. The method of claim 1, wherein the monitoring the attempts to access the shared storage content by the nodes of the cluster further comprises:
monitoring any operations that move content between nodes of the cluster and the shared storage server.

4. The method of claim 1, wherein the tracking the statuses of the local caches of the multiple nodes of the cluster further comprises:
tracking any nodes of the cluster that contain current shared storage content in their local caches, for any regions of the shared storage content.

5. The method of claim 1, wherein the tracking the statuses of the local caches of the multiple nodes of the cluster further comprises:
tracking any nodes of the cluster that contain non-current shared storage content in their associated local caches, for any regions of the shared storage content.

6. The method of claim 1, further comprising:
maintaining current tracked local cache status information; and
responsive to at least one operation targeting at least one region of the shared storage content, updating the current tracked local cache status information to indicate local cache status changes for multiple local caches, for the at least one region of the shared storage content.

7. The method of claim 1, further comprising:
maintaining current tracked local cache status information; and
responsive to a read operation by a specific node of the cluster targeting at least one region of the shared storage content, updating the current tracked local cache status information to indicate a local cache status change for the local cache associated with the specific node, for the at least one region of the shared storage content.

8. The method of claim 1, further comprising:
maintaining current tracked local cache status information; and
responsive to a first write operation by a specific node of the cluster targeting at least one region of the shared storage content, updating the current tracked local cache status information to indicate a local cache status change for the local cache associated with the specific node, and to indicate local cache status changes for additional local caches associated with additional nodes of the cluster, for the at least one region of the shared storage content.

9. The method of claim 1, further comprising:
maintaining current tracked local cache status information; and
storing the current tracked local cache status information in a data structure, wherein
at least a portion of the data structure is stored on the shared storage server such that it is accessible by the multiple nodes of the cluster.

10. The method of claim 9, wherein
the data structure further comprises a bitmap residing on the shared storage server,
the bitmap comprises, for each specific node of the cluster, a separate bit set representing a current tracked local cache status of the local cache associated with the specific node, and
each bit set comprises one bit representing each tracked region of the shared storage content.

11. The method of claim 1, further comprising:
maintaining current tracked local cache status information; and
storing the current tracked local cache status information in a data structure, wherein
a portion of the data structure is stored on the shared storage server such that it is accessible by the multiple nodes of the cluster, and, for each specific node of the cluster, a portion of the data structure is stored locally by and is accessible only to the specific node.

12. The method of claim 11, wherein
the data structure further comprises:
for each specific node of the cluster, a set of data variables representing a current tracked local cache status of the local cache associated with the specific node, and
a single, shared set of data variables indicating a current content status of the shared storage content, and
each specific data variable of each data variable set represents a specific region of the shared storage content.

13. The method of claim 1, further comprising:
maintaining current tracked local cache status information; and
representing specific data volumes of the shared storage content in the current tracked local cache status information.

14. The method of claim 1, further comprising:
initializing all of the tracked local cache status information to indicate that, for each specific node of the cluster, the local cache associated with the specific node is non-current for every region of the shared storage content.

15. At least one non-transitory computer readable-storage medium in a shared storage server for providing cache coherency within a cluster of multiple nodes, the at least one non-transitory computer readable-storage medium storing computer executable instructions that, when loaded into computer memory and executed by at least one processor of a computing device, cause the computing device to:
communicate with a cache coherency instance at each of the multiple nodes of the cluster, wherein
the each of the multiple nodes comprises a local cache that is configured to cache shared storage content of the shared storage server,
each local cache is only accessible by the each node with which the each local cache is associated, and
the shared storage content is accessible by the multiple nodes of the cluster;
receive one or more updates sent from the cache coherency instance executing on the each of the multiple nodes, wherein
the one or more updates represent one or more operations that are configured to access the shared storage content, when performed by the each node, and
each of the one or more updates is sent from a corresponding cache coherency instance after a predetermined number of operations are performed by the each node;
monitor attempts to access the shared storage content by the each of the multiple nodes of the cluster based on the updates;
track statuses of the local caches of the multiple nodes of the cluster by determining whether an access attempt at a node affects the status of the local cache associated with the node and each of the other local caches of the other nodes in the cluster,
wherein
the access attempt comprises one or more accesses that modify the shared storage content and one or more accesses that do not modify the shared storage content, and
each status stored in the shared storage server indicates whether the each local cache has a current version of each portion of shared storage content; and
upon a subsequent access attempt by one node of the multiple nodes to a portion of the shared storage content in a local cache associated with the one node:
access a specific portion of shared storage content from the local cache associated with the one node, if a determination is made from the statuses stored in the shared storage server that the current version of the specific portion of shared storage content is stored in the local cache associated with the one node, and
access the specific portion of shared storage content from the shared storage server, if a determination is made from the statuses that the current version of the specific portion of shared storage content is not stored on the local cache associated with the one node.

16. The at least one non-transitory computer readable-storage medium of claim 15 further storing computer executable instructions to:
use information gleaned from monitoring node-level attempts to access the shared storage content to determine the statuses of the local caches.

17. The at least one non-transitory computer readable-storage medium of claim 15 further storing computer executable instructions to:
track any nodes of the cluster that contain current shared storage content in their local caches, for any regions of the shared storage content; and
track any nodes of the cluster that contain non-current shared storage content in their associated local caches, for any regions of the shared storage content.

18. The at least one non-transitory computer readable-storage medium of claim 15 further storing computer executable instructions to:
responsive to a read operation by a specific node of the cluster targeting at least one region of the shared storage content, updating current tracked local cache status information to indicate a local cache status change for the local cache associated with the specific node, for the at least one region of the shared storage content; and
responsive to a first write operation by the specific node of the cluster targeting the at least one region of the shared storage content, updating the current tracked local cache status information to indicate the local cache status change for the local cache associated with the specific node, and to indicate local cache status changes for additional local caches associated with additional nodes of the cluster, for the at least one region of the shared storage content.

19. A computer system for providing cache coherency within a cluster of multiple nodes, the computer system comprising:
- a processor; and
- system memory, storing:
    - a first module to communicate with a cache coherency instance at each of the multiple nodes of the cluster, wherein
        - the each of the multiple nodes comprises a local cache that is configured to cache shared storage content of the shared storage server,
        - each local cache is only accessible by the each node with which the each local cache is associated, and
        - the shared storage content is accessible by the multiple nodes of the cluster;
    - a second module to receive one or more updates sent from the cache coherency instance executing on the each of the multiple nodes, wherein
        - the one or more updates represent one or more operations that are configured to access the shared storage content, when performed by the each node, and
        - each of the one or more updates is sent from a corresponding cache coherency instance after a predetermined number of operations are performed by the each node;
    - a third module to monitor attempts to access the shared storage content by the each of the multiple nodes of the cluster based on the updates;
    - a fourth module to track statuses of the local caches of the multiple nodes of the cluster by determining whether an access attempt at a node affects the status of the local cache associated with the node and each of the other local caches of the other nodes in the cluster, wherein
        - the access attempt comprises one or more accesses that modify the shared storage content and one or more accesses that do not modify the shared storage content, and
        - each status stored in the shared storage server indicates whether each local cache has a current version of each portion of shared storage content; and
    - a fifth module to, upon a subsequent access attempt by one of the nodes to a portion of shared storage content in a local cache associated with the one node,
        - access a specific portion of shared storage content from the local cache associated with the one node, if a determination is made from the statuses stored in the shared storage server that the current version of the specific portion of shared storage content is stored in the local cache associated with the one node, and
        - access the specific portion of shared storage content from the shared storage server, if a determination is made from the statuses that the current version of the specific portion of shared storage content is not stored on the local cache associated with the one node.

* * * * *